UNITED STATES PATENT OFFICE.

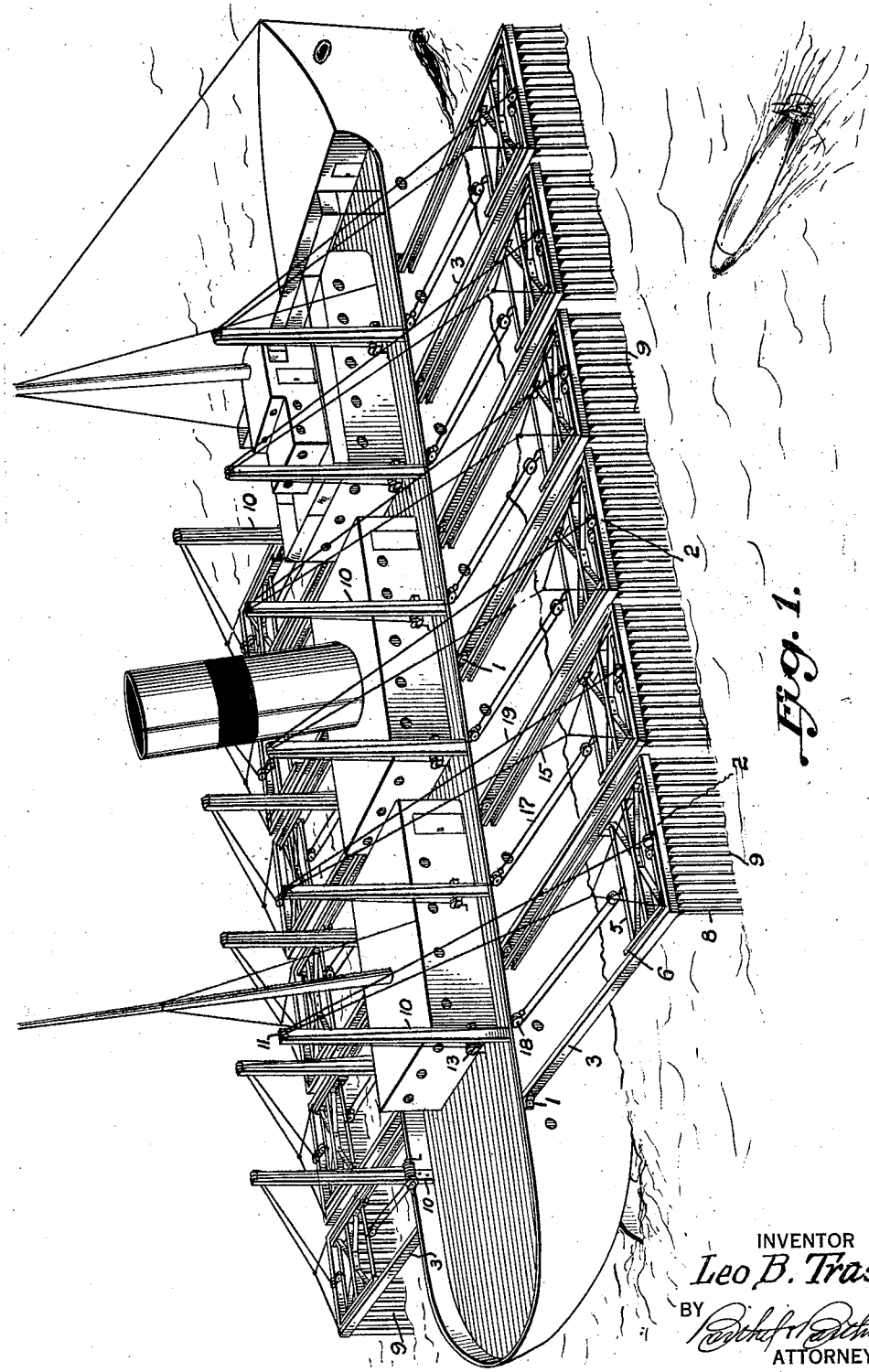

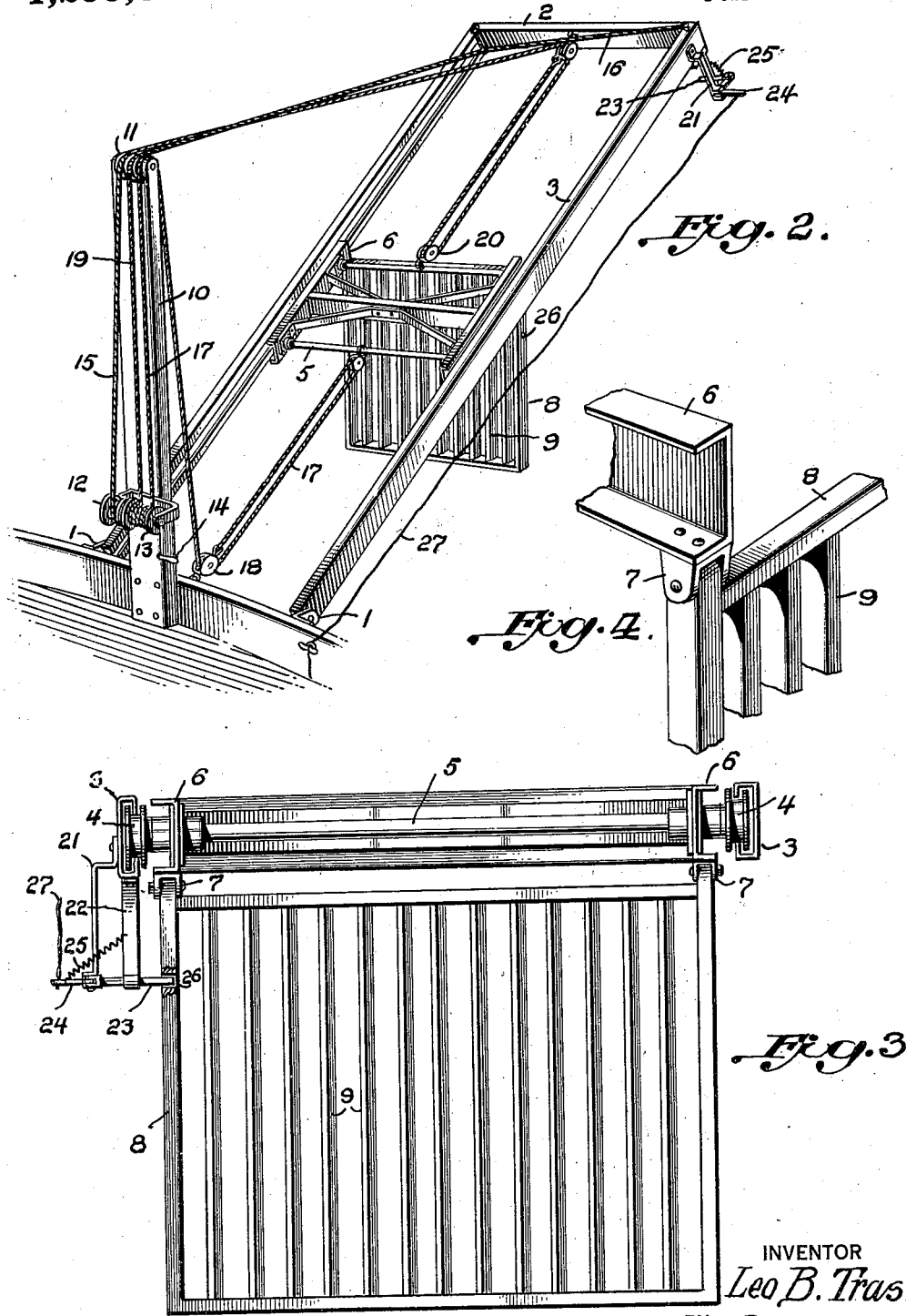

LEO BYRON TRASK, OF DETROIT, MICHIGAN.

SUBMARINE-PROTECTING DEVICE.

1,295,818. Specification of Letters Patent. Patented Feb. 25, 1919.

Application filed December 17, 1917. Serial No. 207,471.

*To all whom it may concern:*

Be it known that I, LEO BYRON TRASK, a citizen of the United States of America, residing at Detroit, in the county of Wayne and State of Michigan, have invented certain new and useful Improvements in Submarine-Protecting Devices, of which the following is a specification, reference being had therein to the accompanying drawings.

This invention relates to submarine nets, and has special reference to nets or similar protecting devices adapted to be carried by vessels.

The primary object of my invention is to furnish sea going boats with nets or protecting devices that may be raised and lowered, so that the nets may be placed in inactive positions when in safe waters thus allowing the vessel to make speed, and lowered to active position when passing through a danger zone, to protect the sides of the vessel from torpedo and submarine attack.

A further object of my invention is to provide outriggers for the nets or protecting devices, and simple, durable and efficient means is employed for simultaneously adjusting the outriggers and nets.

The above and other objects are attained by a mechanical construction that will be hereinafter specifically described and then claimed, and reference will now be had to the drawings, wherein Figure 1 is a perspective view of a vessel provided with the nets or protecting devices and showing the same in active position;

Fig. 2 is a perspective view of one of the outriggers and its net;

Fig. 3 is a front elevation of the net with part of the outrigger broken away, and Fig. 4 is a detail perspective view of a portion of a net and its carrier.

In describing my invention by aid of the views above referred to, I desire to point out that the same are intended as merely illustrative of one way in which my invention may be put into practice, and I do not care to confine myself to the precise construction and arrangement of parts shown. The following description is therefore to be broadly construed as including such substitute constructions and arrangement of parts which are the obvious equivalent of those to be hereinafter referred to.

To put my invention into practice, I provide the gunwale or side of a vessel with sets of brackets or bearings 1 and pivotally connected thereto is an outrigger frame 2 having parallel side rails 3 that are preferably made of channel bars with the open sides thereof confronting, so as to receive flanged members or wheels 4 revolvable on axles 5 mounted in the ends of a carrier 6. The carrier 6 may be constructed of channel members and angle braces, as best shown in Fig. 2.

At the outer end of the carrier 6 are hangers 7 for a net or protecting device 8, and as shown this net or protecting device may be made of a frame provided with a plurality of slats or any suitable net work which will retard the progress of or cause the detonation of a torpedo or other dangerous implement of war directed at the vessel.

The side of the vessel, intermediate the brackets or bearings 1, is provided with a stanchion 10 having sheaves 11 at the upper end thereof and rotatable spools or drums 12 and 13 adjacent the lower end thereof. The spools or drums 12 and 13 rotate together and are similar to an ordinary hoisting drum adapted to be easily operated by a crank 14 or from a donkey engine or other source of power. Attached to the drum 13 and adapted to be wound thereon is a cable 19 extending over one of the sheaves 11 and having branch portions 16 connected to the outer end of the outrigger frame 2, said cable being employed for raising the outrigger frame from an active position, such as shown in Fig. 1, to an inactive position, as shown in Fig. 2.

Attached to the drum 13 and adapted to be wound and unwound thereon is a cable 17 extending upwardly over another of the sheaves 11 and said cable forms part of a block and tackle 18 connecting the innermost axle 5 and the side of a vessel, so that the carrier may be pulled inwardly on the outrigger frame to an inactive position.

Attached to and adapted to be wound and unwound on the drum 12 is another cable 15 and this cable forms part of a block and tackle 20 connecting the outer end of the outrigger frame 2 to the outermost axle 5, so that the carrier may be shifted to the outer end of the outrigger frame 2 and placed in an active position. The manner of attaching the cables 15, 17 and 19 to the drums 12 and 13 and winding and unwinding the same thereon is such that when the outrigger frame is raised to an inactive position the carrier will be drawn inwardly, also that when the outrigger frame 2 is lowered to an active position, the carrier will be shifted to the outer end thereof.

On the outer end of the outrigger frame 2 and at one end thereof is a bracket 21 and a guide 22, the latter being for a pin 23 connected to a bell crank 24 carried by the bracket 21. The pin 23 is held normally in an extended position by a coiled retractile spring 25 connecting the bell crank 24 to the guide 22 and said pin is adapted to enter an opening 26 in the side of the net or protecting device 8 and lock the same in a vertical position substantially at a right angle to the outrigger frame 2.

A cable or cord 27 it attached to the bell crank 24 so that the pin 23 may be retracted when it is desired to raise the outrigger frame and swing said frame and the net to an inactive position.

By reference to Fig. 1, it will be noted that the sides of the vessel are provided with a plurality of the nets or protecting devices so that practically the entire sides of the vessel will be protected against torpedo attack. When the nets or protecting devices are in lowered positions, said nets or devices extend into the water for a sufficient depth to protect the hull of the vessel and as all of the nets or devices longitudinally aline at each side of the vessel, there is a minimum of resistance to the progress of the vessel, and after passing through danger zones, the nets or protecting devices may be raised so that the vessel may make speed.

What I claim is:—

1. A protecting device for vessels, comprising an outrigger frame adapted to be pivotally connected to the side of a vessel, a carrier movable longitudinally of said outrigger, a net suspended from the outer end of said carrier, means connected to said carrier and said outrigger frame adapted for raising and lowering said outrigger frame and shifting said carrier longitudinally thereof, and means at the outer end of said outrigger frame adapted for locking said net in an active position relatively to said outrigger frame.

2. The combination with a vessel, of a stanchion at the side thereof, an outrigger pivotally connected to the side of said vessel adjacent said stanchion, a carrier movable longitudinally of said outrigger, a net extended from said carrier, and means attached to said carrier and said outrigger and operatable at said stanchion adapted for simultaneously moving said outrigger and shifting said carrier longitudinally thereof.

3. The combination with a vessel, of a stanchion at the side thereof, an outrigger pivotally connected to the side of said vessel, a carrier movable longitudinally of said outrigger, a protecting device suspended from the outer end of said carrier, means connected to said carrier, the side of said vessel and said outrigger and operatable at said stanchion adapted for simultaneously adjusting said outrigger and shifting said carrier longitudinally thereof, and means operatable at the side of the vessel and at the outer end of the outrigger adapted for locking said carrier and its protecting device in an active position.

In testimony whereof I affix my signature in the presence of two witnesses.

LEO BYRON TRASK.

Witnesses:—
KARL H. BUTLER,
ANNA M. DORR.

Copies of this patent may be obtained for five cents each, by addressing the "Commissioner of Patents, Washington, D. C."